(12) United States Patent
Franke et al.

(10) Patent No.: US 6,300,734 B1
(45) Date of Patent: Oct. 9, 2001

(54) MOTOR CONTROL APPARATUS FOR A RAILWAY SWITCH MACHINE

(75) Inventors: Raymond C. Franke, Glenshaw; Robert P. Bozio, Pittsburgh; Leonard M. Wydotis, Mars, all of PA (US)

(73) Assignee: Union Switch & Signal, Inc., Pittsburgh, PA (US)

( * ) Notice: Subject to any disclaimer, the term of this patent is extended or adjusted under 35 U.S.C. 154(b) by 0 days.

(21) Appl. No.: 09/490,306

(22) Filed: Jan. 24, 2000

(51) Int. Cl.$^7$ ........................................................ H02P 7/00
(52) U.S. Cl. ............................................. 318/286; 318/282
(58) Field of Search ..................................... 318/280, 282, 318/286, 375, 466, 468; 246/218, 220, 221

(56) References Cited

U.S. PATENT DOCUMENTS

| | | | |
|---|---|---|---|
| 3,588,652 | * 6/1971 | Lewis ..................................... | 318/282 |
| 3,781,617 | * 12/1973 | Thomas ................................. | 318/261 |
| 3,789,238 | * 1/1974 | Presentey .............................. | 307/119 |
| 3,963,363 | * 6/1976 | Roper ..................................... | 404/11 |
| 4,621,223 | * 11/1986 | Murakami et al. ................... | 318/282 |
| 4,703,303 | 10/1987 | Snee . | |
| 4,742,280 | * 5/1988 | Ishikawa et al. ..................... | 318/282 |
| 4,833,376 | * 5/1989 | Shimura ................................ | 318/286 |
| 4,934,633 | 6/1990 | Ballinger et al. . | |
| 4,942,395 | 7/1990 | Ferrari et al. . | |
| 5,098,044 | 3/1992 | Petit et al. . | |
| 5,502,367 | 3/1996 | Jones . | |
| 5,543,596 | 8/1996 | Jones et al. . | |
| 5,747,954 | 5/1998 | Jones et al. . | |
| 5,806,809 | 9/1998 | Danner . | |
| 5,834,914 | 11/1998 | Moe et al. . | |
| 5,852,350 | 12/1998 | Le Voir . | |
| 5,868,360 | 2/1999 | Bader et al. . | |
| 5,914,576 | * 6/1999 | Barba .................................... | 318/282 |
| 6,108,220 | * 8/2000 | Franke ................................... | 363/37 |

* cited by examiner

*Primary Examiner*—Robert E. Nappi
*Assistant Examiner*—Rina I. Duda
(74) *Attorney, Agent, or Firm*—Kirk D. Houser; Eckert Seamans Cherin & Mellott, LLC (57) ABSTRACT

A motor control apparatus for a railway switch machine includes a power source for a voltage; a selector for providing the voltage to a reversible motor of the switch machine in a normal state, and for providing a reverse polarity of the voltage to the reversible motor in a reverse state; a first transistor for switching reverse current flowing through the reversible motor; a first diode electrically connected in parallel with the first transistor for conducting normal current for the reversible motor; a second transistor for switching normal current flowing through the reversible motor; a second diode electrically connected in parallel with the second transistor for conducting reverse current for the reversible motor; and a circuit for controlling the first and second transistors based upon the position or operating mode of the railway switch machine.

28 Claims, 4 Drawing Sheets

MOTOR CONTROL APPARATUS FOR A RAILWAY SWITCH MACHINE

BACKGROUND OF THE INVENTION

1. Field of the Invention

The invention relates to motor control apparatus and, more particularly, to a motor control apparatus for a railway switch machine having a reversible motor.

2. Background Information

In order to optionally switch a railroad train operating on a first track to a second, merging track, it is typical to provide a switch with a pair of "switch points" which are selectively movable horizontally to deflect the train toward one or the other of the tracks. The switch can encompass a pair of switch rail lengths of the second track which extend several feet in length with the switch points being essentially tapered end sections of those rail lengths. The switch points, typically labeled as "normal" and "reverse", are selectively movable back and forth between a pair of stock rails. These provide a normal position in which the train is directed toward the first track by the normal switch point being positioned against a first rail of the first track, and a reverse position in which the train is directed toward the second track by the reverse switch point being positioned against the opposite rail of the first track.

The switch points are typically attached to each other via a plurality of tie rods, at least one of which doubles as a switch throw rod. The throw rod is driven by a remotely controlled electrical switch machine, or, in some instances, by a hand lever operated switch machine, between extended and retracted positions. Depending upon the side of the track on which the switch machine is placed, the extended position can be the normal or the reverse condition of the switch points, and vice versa for the retracted position.

Switch machines employ reversible electric motors to drive a series of gears which are attached to the throw rod. Depending upon the control signals received at the switch machine, the motor is driven one direction or the other to either extend or retract the throw rod and, thus, move the switch points between normal and reverse switching positions. Lock connecting rods are also attached to the switch points. The lock connecting rods passively move back and forth with the switch points and cooperate with locking elements in the machine housing to lock the switch into a normal or a reverse switch position.

Figure 1:
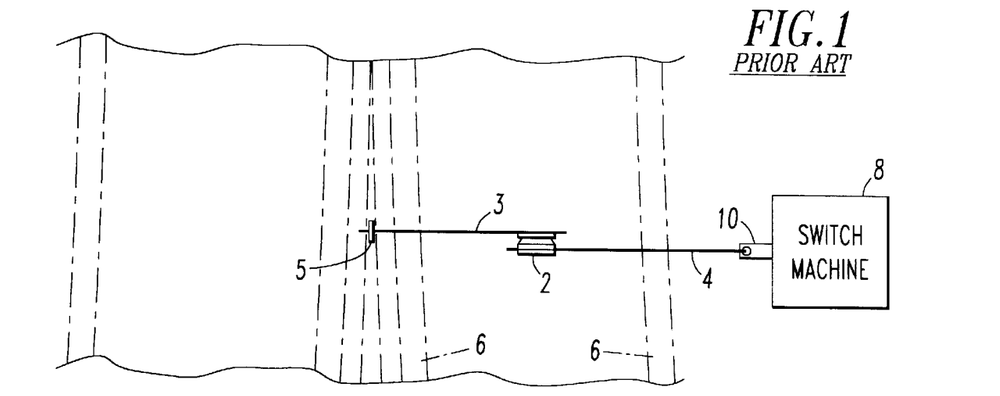
FIG. 1 is a schematic depiction of a conventional switching configuration, showing a switch machine and a switch point adjuster utilizing two operating rods.

Referring to FIG. 1, a switch point adjuster 2 is schematically depicted. The exemplary switch point adjuster 2 utilizes two separate rods 3, 4 and a frog 5, although a single operating rod (not shown) may be employed. The exemplary switch point adjuster 2 is located at the center of the track 6, although other such adjusters may be employed on the left side (with respect to FIG. 1) and opposite the switch machine 8. The first rod 3 connects the switch point adjuster 2 to the frog 5, and the second rod 4 connects the switch point adjuster 2 to the operating bar 10 of the switch machine 8. Thus, when the switch machine 8 throws six inches, the slack is taken up in the switch point adjuster 2 so that the frog 5 is only moved its required amount. Both operating rods 3, 4 are supported by support rollers (not shown).

Figure 2:
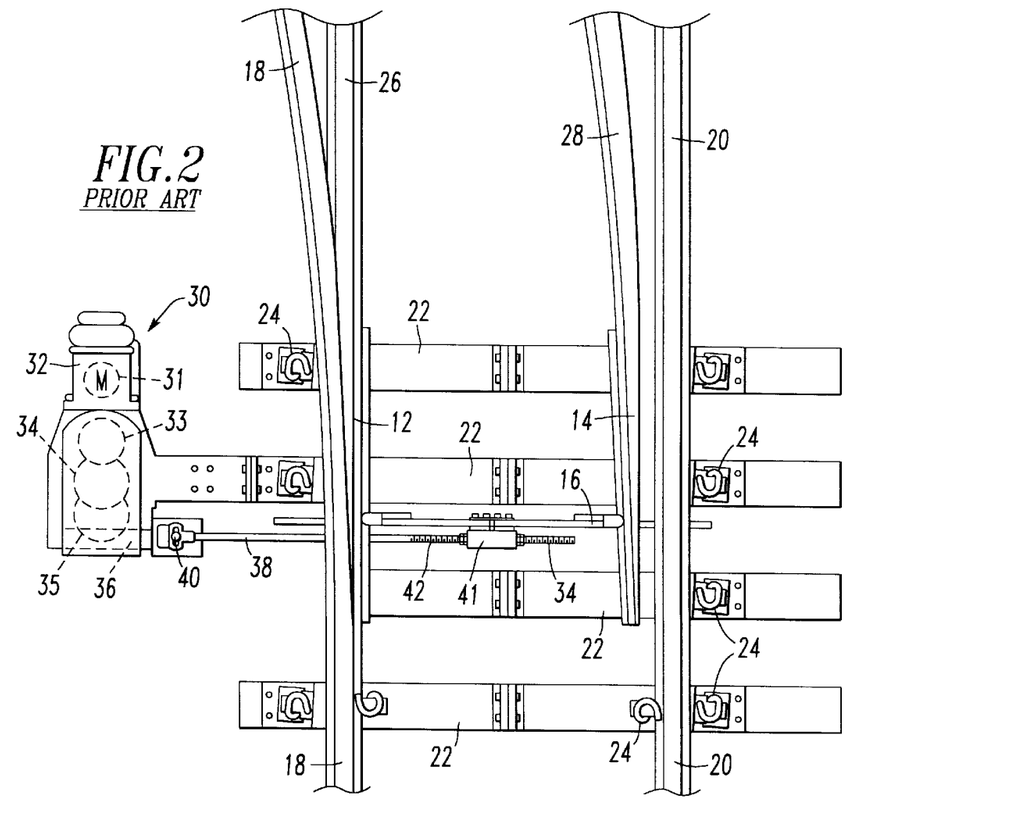
FIG. 2 is a top plan view of a switch machine with the outline of the motor and switch operating gears shown in hidden line drawing, and with the switch points switched to a "normal" position in which a train would continue straight through the intersection.

As shown in FIG. 2, a railroad switch includes a pair of switch points 12,14 which are linked by one or more tie rods 16. The switch points 12,14 are selectively movable between a "normal" position (as shown) and a "reverse" position. In the illustrated normal position, the switch point 12, commonly called the normal switch point, is positioned against a stationary stock left rail 18, and the switch point 14, commonly called a reverse switch point, is moved away from a stationary stock right rail 20. The stock left and right rails 18 and 20 are anchored to a plurality of cross ties 22 via rail anchors 24 in a conventional manner. In a normal position, the normal switch point 12 directs a train entering the railroad switch straight through the intersection via the right stock rail 20 and the switch point 12, which tapers outward into a straight left rail 26 past the switch.

In a reverse position (not shown) both the normal switch point 12 and the reverse switch point 14 are moved to the right (with respect to FIG. 2) with the normal switch point 12, thus, moving away from the stock left rail 18 and the reverse switch point 14 moving to a position against the stock right rail 20. The reverse switch point 14 is then in a position to direct the train to the left via the left rail 18, which curves to the left past the switch, and via the reverse switch point 14, which tapers outward to a curved right track 28 past the switch.

The switch points 12 and 14 are selectively moved via a switch machine 30. The switch machine 30 includes a reversible electric motor (M) 31 (shown in hidden line drawing) in a motor housing 32. The motor 31 is connected to drive a series of gears 33,34,35 (shown in hidden line drawing) which, in turn, drive a throw bar 36 (shown in hidden line drawing), either to the left or the right (with respect to FIG. 2). The throw bar 36 is connected to a throw rod 38 via a linkage 40. The throw rod 38, in turn, is connected to the tie rod 16 via a switch basket 41. The switch basket 41 is internally threaded to receive threads 42 on the throw rod 38, in order that the switch point position at either end of travel of the throw rod 38 is adjustable. For example, a typical stroke length for the throw bar 36 would be approximately five inches.

Historically, switch machine motor controls employed mostly 3-wire (FIG. 4) or 5-wire (FIG. 5) control for permanent magnet or wound field motors, respectively.

Figure 3:
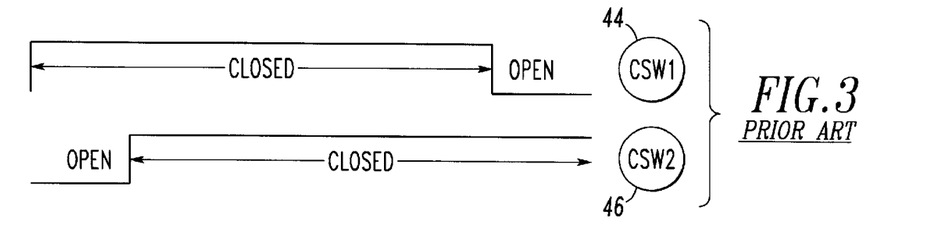
FIG. 3 is a timing diagram for two cam switches.

In a switch machine, linear motion of the mechanism moving the points (such as 12 and 14 of FIG. 2) is converted into rotary motion. Rotary operated cam switches, in turn, are used to open the motor circuit at the end of the stroke and steer current to change direction. FIG. 3 illustrates the operation of cam switch (CSw1) 44 and cam switch (CSw2) 46. For normal operation, CSw1 is closed for most of the cycle and, then, opens at the end of the cycle to open the motor circuit and stop the motor. For reverse operation, CSw2 is closed for most of the cycle and, then, opens at the end of the cycle to open the motor circuit and stop the motor.

Figure 4:
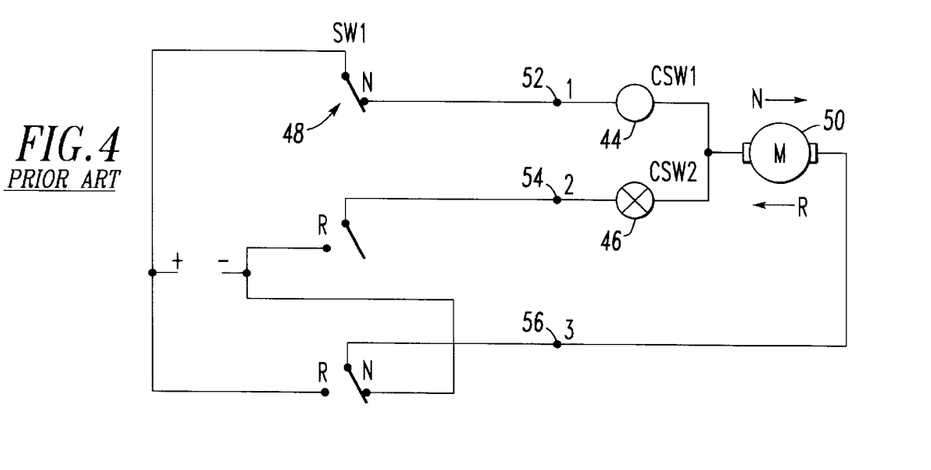
FIG. 4 is a schematic diagram of a three-pole switch, and two cam switches providing three-wire control for a permanent magnet motor.

FIG. 4 illustrates how the two cam switches 44,46, in conjunction with a three-pole switch (SW1) 48, are used to control a three-wire permanent magnet motor (M) 50 using 3 wires 52,54,56. In FIG. 4, the full normal rotation is shown completed, there is no normal (N) current, CSw1 is open and CSw2 is closed. When SW1 is moved from the normal (N) to the reverse (R) position, reverse (R) motor current flows as indicated and the cam revolves in a suitable rotational direction until CSw2 opens and the motor 50 stops.

Figure 5:
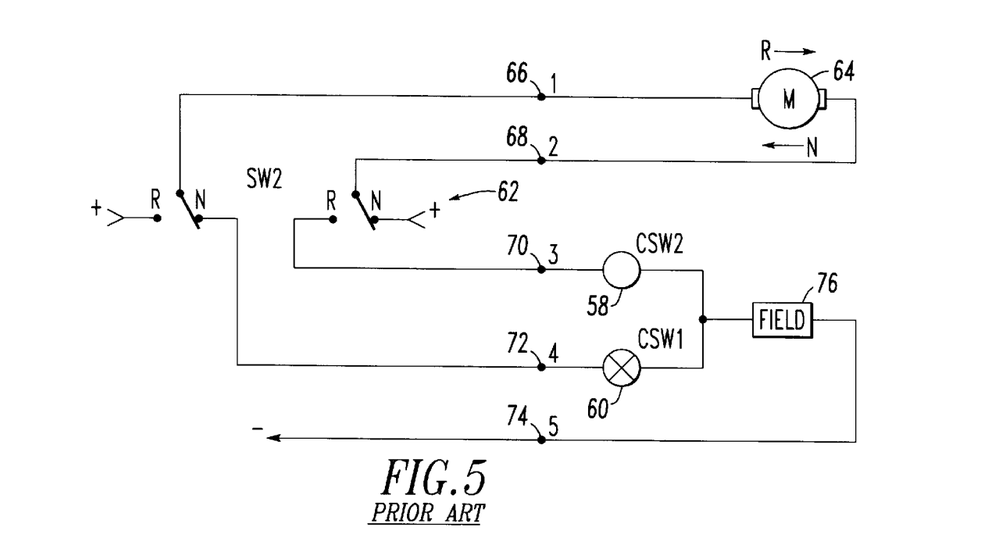
FIG. 5 is a schematic diagram of a two-pole switch, and two cam switches providing five-wire control for a wound field motor.

FIG. 5 shows how two cam switches 58,60, in conjunction with a double-pole switch (SW2) 62, are used to control a wound field motor (M) 64 using 5 wires 66,68,70,72,74. In this case, motor armature current is reversed for each of the normal (N) and reverse (R) directions, but current through the field 76 is unidirectional. Operation of the cam switches 58,60 is the same as the respective cam switches 46,44 of FIG. 4.

For both FIGS. 4 and 5, the point at which the respective motors 50,64 stop is not well controlled. This is because the circuit is simply opened and the precise stopping point is determined by inertia and by friction that is to be overcome. The friction is not well controlled, particularly, because the switch machine must operate over a wide temperature range. It is common for the friction to be significantly greater in cold weather because grease at cold temperatures is more viscous.

U.S. Pat. No. 5,747,954 discloses a two-terminal configuration having contacts at the terminals of the motor. An electronic controller circuit for the power down function of a highway crossing guard mechanism eliminates the "pumping" condition that can cause undue stress and damage to the guard mechanism. For the up direction, power is supplied through one contact to the motor and through another contact from the motor. At approximately 90°, a controller contact opens and MCR contacts drop to their "b" positions. A contact feeds power to a hold clear solenoid coil that sets the brake for the gate arm. Then, for power down operation, power is supplied to the motor through a MOSFET and diode of a power down module until, at approximately 45°, a contact is opened. In many applications, it is desirable at one position to change from a motor-powered down mode to an electrical braking mode using the motor as a generator and employing dynamic braking of the crossing arm as it travels further downward to another position. A diode and a dynamic braking resistor in parallel with the motor, during movement between those positions, exercise some control over the speed of the descending gate arm.

U.S. Pat. No. 4,703,303 discloses a solid state railroad gate controller having a logic circuit.

U.S. Pat. No. 5,806,809 discloses a switch point detection system and method that uses a series of proximity detectors positioned proximate the switch point(s) of a railroad switch. A switch machine motor is connected by 3 wires to a biased neutral controller.

Although the prior art shows various types of motor controls for railway switch machines, there is room for improvement.

SUMMARY OF THE INVENTION

In accordance with the invention, a control apparatus for a railway switch machine comprises means for sourcing a voltage; means for providing the voltage to a reversible motor of the switch machine in a normal state, and for providing a reverse polarity of the voltage to the reversible motor in a reverse state; first means for switching current flowing through the reversible motor; a first diode electrically connected in parallel with the first means for switching, the first diode conducting normal current for the reversible motor; second means for switching current flowing through the reversible motor; a second diode electrically connected in parallel with the second means for switching, the second diode conducting reverse current for the reversible motor; and means for controlling the first and second means for switching.

Preferably, the means for controlling includes means for sensing positions of the switch machine, means for operating the first and second means for switching in response to the sensed positions in order to selectively control energization of the motor, and means for selectively applying dynamic braking to the motor when the means for operating the first and second means de-energizes the motor. The means for selectively applying dynamic braking may include a series combination of a solid state relay and a resistor, with the series combination being electrically connected in parallel with the motor. This provides a mechanism to more precisely stop the motor at the end of its stroke.

As one aspect of the invention, the first means for switching current and the second means for switching current include first and second cam switches which are electrically connected in series with the motor.

Preferably, two connections between the cam switches and two motor terminals are provided.

As another aspect of the invention, the first means for switching current and the second means for switching current include two transistors which are electrically connected in series with the motor. Preferably, each of the transistors has a source electrically connected to the source of the other transistor.

As a still further aspect of the invention, a control apparatus for a railway switch machine comprises means for providing a voltage from a power source to a reversible motor of the switch machine in a normal state, and for providing a reverse polarity of the voltage to the reversible motor in a reverse state; first means for switching current flowing through the reversible motor; a first diode electrically connected in parallel with the first means for switching, the first diode conducting normal current for the reversible motor; second means for switching current flowing through the reversible motor; a second diode electrically connected in parallel with the second means for switching, the second diode conducting reverse current for the reversible motor; and means for controlling the first and second means for switching.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

In the railroad industry, "vital" is a term applied to a product or system that performs a function that is critical to safety, while "non-vital" is a term applied to a product or system that performs a function that is not critical to safety.

Additionally, "fail-safe" is a design principle in which the objective is to eliminate the hazardous effects of hardware or software faults, usually by ensuring that the product or the system reverts to a state known to be safe.

Figure 6:
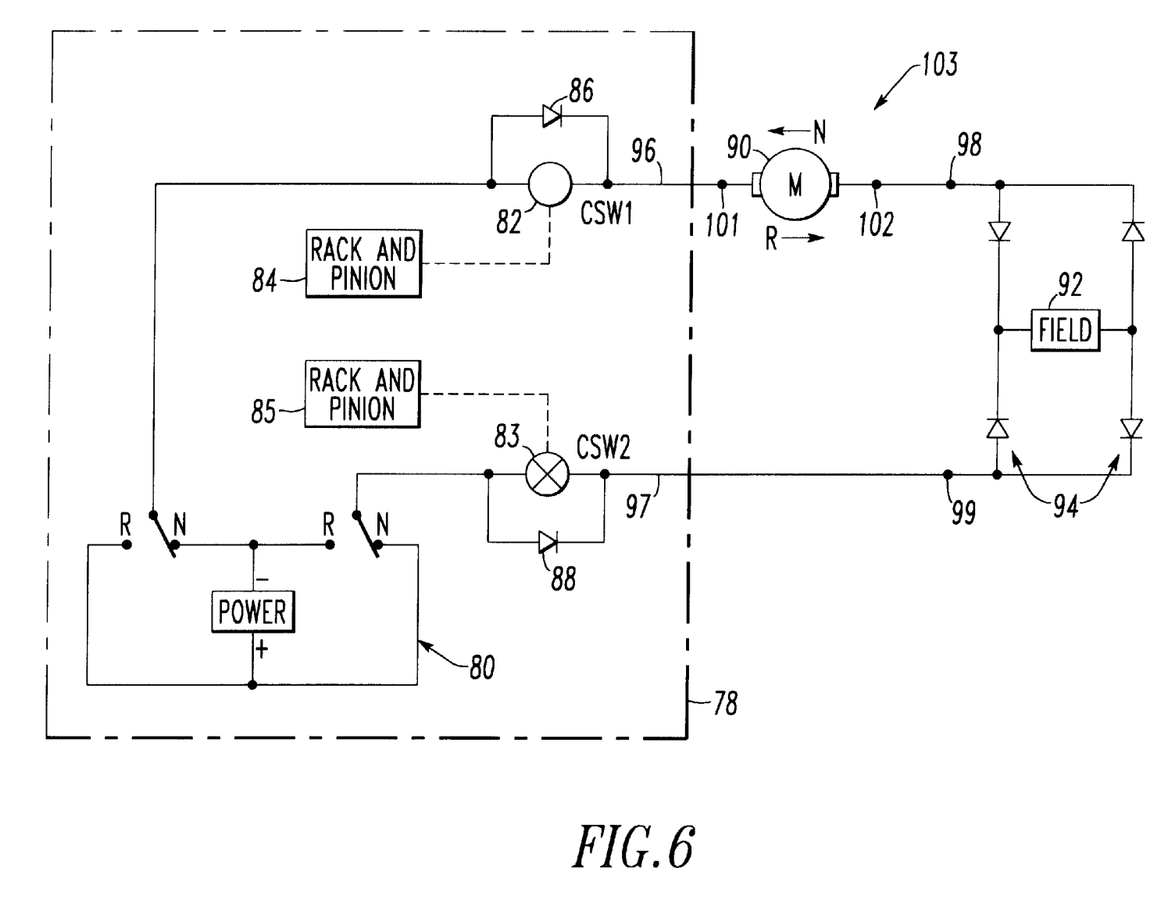
FIG. 6 is a schematic diagram of two-wire motor control for a wound field motor in accordance with an embodiment of the present invention.

Referring to FIG. 6, a two-wire motor control circuit 78 is illustrated. In this embodiment, a double pole, double throw switch 80 is used in combination with first (CSw1) and second (CSw2) cam switches 82,83, which are controlled by respective rack and pinion mechanisms 84,85. The cam switches 82,83 have parallel diodes 86,88, respectively. Reverse (R) current for permanent magnet or wound field motor (M) 90 passes through diode 86 and closed cam switch 83, while normal (N) current passes through diode 88 and cam switch 82 when it is closed (not shown). The motor 90 drives switch machine 103 normal or reverse in response to the respective normal (N) or reverse (R) current flow. The cam switches 82,83 switch current and are electrically connected in series with the motor 90. For example, as a normal stroke is completed, cam switch 82 opens and diode 86 blocks normal motor current. Then, when reverse motion is initiated by moving switch 80 from the normal (N) to the reverse (R) position, reverse current is conducted by diode 86 and around open cam switch 82. Shortly after reverse motion is initiated, cam switch 82 closes and reverse current is diverted therethrough. At the end of the reverse stroke, the cam switch 83 opens, diode 88 blocks reverse motor current, and the motor 90 is stopped.

Also shown in FIG. 6 is a field winding 92 within a bridge rectifier 94. The bridge 94 is employed to maintain the current in the field winding 92 even as the armature current is reversed (i.e., N to R, R to N). The motor 90 includes a first terminal 101, a second terminal 102, the field winding 92, and the bridge rectifier 94 having inputs 98,99 and an output for energizing the field winding 92. The cam switch 82 is electrically connected to the first motor terminal 101. The second motor terminal 102 is electrically connected to the first bridge rectifier input 98. The cam switch 83 is electrically connected to the second bridge rectifier input 99. Hence, there are two electrical connections (e.g., wires) between the reversible motor 90 and the two cam switches 82,83, with the motor armature and field being in series. In this manner, the wound field motor 90 is controlled with two wires 96,97 instead of five wires (FIG. 5) by the inclusion of the diodes 86,88. The motor 90, in turn, is part of the switch machine 103 which has a normal stroke and a reverse stroke.

Figure 7:
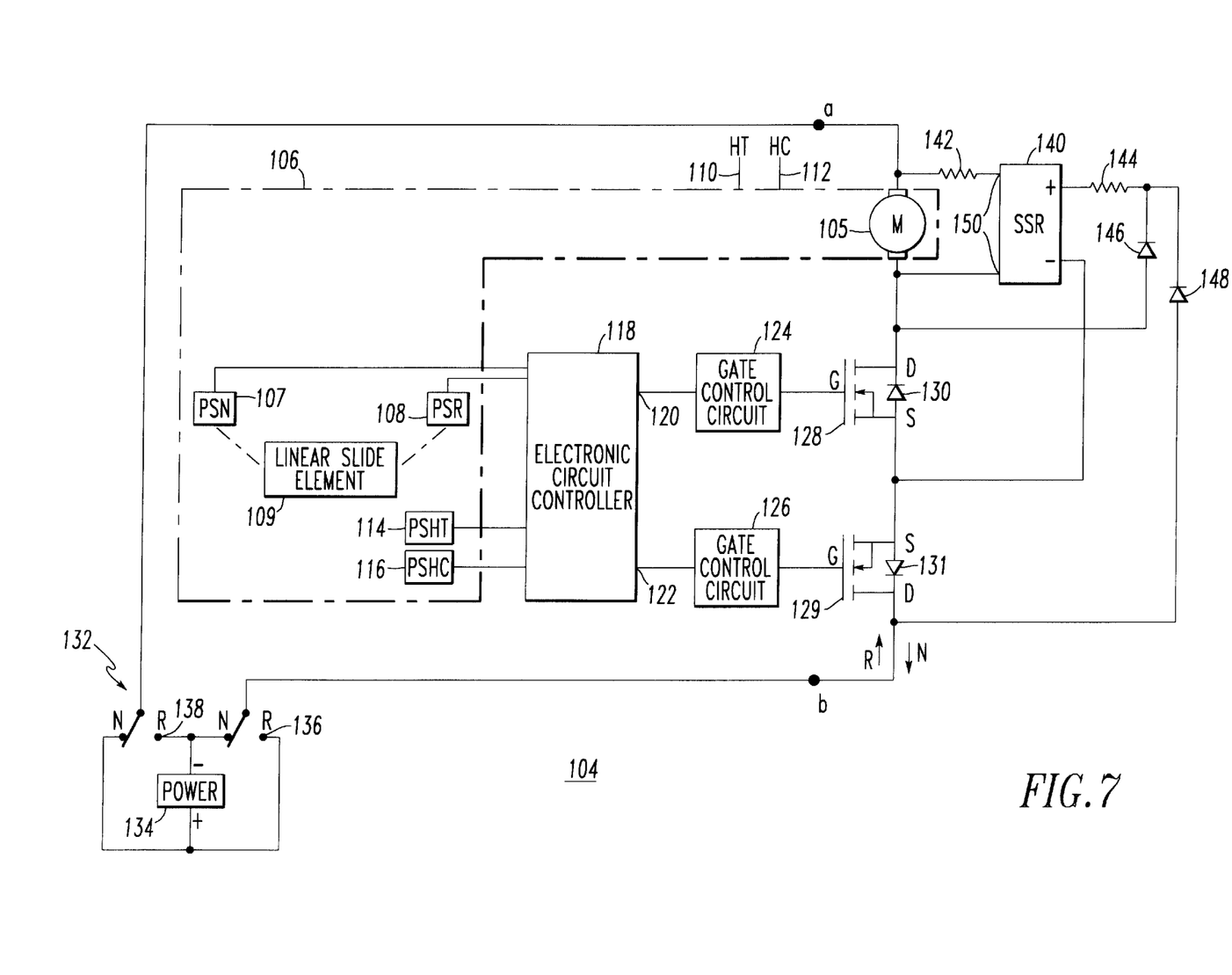
FIG. 7 is a schematic diagram of two-wire motor control in accordance with another embodiment of the present invention.

FIG. 7 illustrates a two-wire motor control circuit 104 for stopping reversible railway switch machine motor (M) 105 from coasting after power is removed. The circuit 104, further, provides a mechanism to cut power if hand operation of the switch machine 106 is desired. Normal (PSN) 107 and reverse (PSR) 108 proximity sensors of a linear slide element 109 are positioned within the switch machine 106 and respond at the extremities of linear movement thereof. Normal sensor 107 is employed to sense the end of normal movement and to open the motor circuit when the limit of normal travel is reached, while reverse sensor 108 is employed for the same function, except for movement in the opposite direction. The sensors 107,108, thus, sense positions of the switch machine 106. In this embodiment, linear motion is sensed directly, but the invention is also applicable to rotary motion sensors.

The exemplary switch machine 106 includes both a hand throw (HT) lever 110 and a hand crank (HC) 112 to facilitate moving the switch points (not shown) by hand, although the invention is applicable to switch machines having only one or none of the hand throw lever 110 and hand crank 112. When the switch points are moved manually, it is a preferred practice to open the motor circuit in order to prevent powering of the motor 105. Conventionally, this is accomplished with mechanical switches, in series with the motor, which open whenever manual operation is initiated.

In the present embodiment, the same function is accomplished with additional proximity sensors including a hand throw sensor (PSHT) 114 and a hand crank sensor (PSHC) 116. In turn, the four sensors 107,108,114,116 are connected into an electronic circuit controller (ECC) 118. The exemplary microprocessor-based ECC 118 monitors the state of each of these four sensors and performs suitable logic functions in order to control two outputs 120,122 for gate control circuits 124,126 and transistors 128,129, respectively, in response to the sensed positions and operating modes of the switch machine 106. In this manner, the ECC 118 selectively controls energization of the motor 105.

A diode 130 is electrically connected in parallel with the transistor 128 and is for conducting reverse (R) current, while another diode 131 is electrically connected in parallel with the transistor 129 and is for conducting normal (N) current for the motor 105. Preferably, the transistors 128,129 are high-power MOSFETs, which function as a bilateral switch. These transistors have their sources (S) electrically connected together and are electrically connected in series with the motor 105 for switching current flowing therethrough. Also, the diodes 130,131 are preferably body diodes of the respective MOSFETs 128,130. Although N-channel FETs are shown, P-channel FETs may also be employed. N-channel FETs are preferred, however, because the "on" resistance of those devices is lower that of P-channel devices.

Continuing to refer to FIG. 7, at the end of a normal stroke, with "a" positive with respect to "b", MOSFET 128 is turned off by the gate control circuit 124 in response to the ECC output 120, and diode 130 blocks the normal (N) current for the motor 105. After the normal stroke is completed, and when the reverse stroke is initiated, the reverse (R) current for the motor 105 is conducted by diode 130 when MOSFET 128 is turned off. When reverse motion is first initiated, motor current is conducted via diode 130. As the linear slide element moves marginally away from PSN 107, the ECC 118 turns MOSFET 128 on and the body diode 130 is shunted by the reduced conduction path from the source to the drain of MOSFET 128. Then, after the reverse stroke is completed, the gate control circuit 126, in response to the ECC output 122, turns off MOSFET 129 and diode 131 blocks reverse (R) current for the motor 105. Otherwise, with both of the MOSFETs 128,129 being turned on, such MOSFETs conduct both the normal and the reverse current for the motor 105. Preferably, the ECC 118 controls the gate control circuits 124,126 in order that only one of those MOSFETs is selectively turned on to, thus, selectively conduct only one of the normal current and the reverse current.

The exemplary gate control circuits 124,126 provide electrical isolation between the high voltage and high power of the motor circuit and the ECC 118 and, further, serve as a suitable interface to properly drive the gates (G) of the MOSFETs 128,129. In some instances, it is desirable to use more than one MOSFET connected in parallel in order to share motor load current and, thus, reduce the voltage drop. Alternatively, solid state relays with MOSFET outputs may be employed. Those relays may be used to replace the gate control circuits and the MOSFETs. Preferably, in terms of cost, gate control circuits and separate MOSFETs are preferred.

During operation of the switch machine 106, it may, initially, be in the normal position, with the PSR, PSHT and PSHC sensors 108,114,116 being "on" and the PSN sensor 107 being "off". In this regard, the terms "off" and "on" are employed to simply distinguish one state from another (e.g., sensing a metal target or not detecting a metal target). Logical decisions are made within the ECC 118 which, in the preferred embodiment, includes a microprocessor for carrying out additional functions as well as controlling the motor 105. In this initial state, output 120 and MOSFET 128 are off, and output 122 and MOSFET 129 are on.

In order to drive the switch machine 106 to the reverse state, switch 132 is moved from the normal (N) position to the reverse (R) position. This changes the polarity between "a" and "b" and makes the polarity of "b" relative to "a" positive. Hence, reverse (R) current is conducted from power source 134 (+) to reverse contact 136 to "b," through MOSFET 129, which is on, through the body diode 130 of MOSFET 128, which initially is off, and through motor 105 to "a" and back to reverse contact 138 to power source 134 (−). Thus, the switch 132 and power source 134 provide a voltage to the motor 105 in the normal state, and provide a reverse polarity of the voltage to the motor 105 in a reverse state. After motion begins, PSN sensor 107 changes state to on, the ECC changes output 120 to on, and the GCC 124 turns MOSFET 128 on, thereby changing the current path from its body diode 130 through the source (S) to drain (D).

At the end of the reverse stroke, the PSR sensor 108 senses its target (not shown) and changes state to off, the ECC changes output 122 to off, and the GCC 126 turns MOSFET 129 off. This opens the motor circuit, thereby stopping the motor 105. As discussed below, the motor control circuit 104 selectively applies dynamic braking to the motor 105 when the ECC 118 de-energizes the motor 105.

At this position, the conditions are established to drive the switch machine normal. That occurs when "a" is positive relative to "b", which results when the switch 136 is moved to the normal (N) position. Throughout most of the cycle, both the PSN and PSR sensors 107,108 are both on, both MOSFETs 128,129 are on, the motor current conducts equally well for either polarity, and the motor current direction may be changed with switch 132. However, with MOSFET 128 on and MOSFET 129 off, motor current selectively flows in the normal (N) direction, while with MOSFET 129 on and MOSFET 128 off, motor current selectively flows in the reverse (R) direction.

The motor control circuit 104 provides the mechanism to functionally mimic the two-wire motor control of FIG. 6 in which diodes 86,88 are connected across respective cam switches 82,83, however, in the embodiment of FIG. 7, the diodes 130,131 may be an integral part of the respective MOSFET transistors 128,129. The exemplary embodiment transcends the need for, but is compatible with, cam operated switches. In this embodiment, there is insufficient room in the exemplary switch machine 106 to mount a mechanical switch. However, the proximity sensors 107,108 may be used to activate solid state relays or the transistors 128,129 to perform the motor cut-off function.

Although a conventional double pole, double throw switch 132 is shown in FIG. 7 for convenience of reference, any suitable polarity reversing mechanism (e.g., relay or microprocessor controls) may be employed.

Continuing to refer to FIG. 7, opening the circuit will stop the motor 105, but the precise point at which it stops is largely influenced by the drag of friction in the gearing and the load being pushed. To more precisely stop the motor 105, dynamic breaking is employed and is implemented by solid state relay (SSR) 140, resistors 142,144, and diodes 146, 148. The series combination of the output 150 of SSR 140 and the resistor 142 is electrically connected in parallel with the motor 105. At the end of the normal stroke, with "a" positive with respect to "b", MOSFET 128 is turned off. At that time, the full voltage of the voltage source 134, less the relatively small forward voltage across the body diode 131 of MOSFET 129, appears across MOSFET 128, with its drain (D) positive with respect to its source (S). However, conduction is initiated from the drain of MOSFET 128, through diode 146 and resistor 144 to the positive (+) input of the SSR 140, and back through the SSR negative (−) input to the source of MOSFET 128, thereby turning the SSR 140 on. With the SSR 140 energized, the output 150 thereof electrically connects resistor 142 in parallel with the motor 105 which continues to rotate. In turn, the motor 105 acts as a generator with the stored energy of motion being dissipated in resistor 142. The dynamic braking action stops the motor 105 relatively quicker than if it were left to free run. Since dynamic braking is the dominant stopping force, the variation in the stopping point is less than if it were dependent on the highly variable influence of friction alone.

Accordingly, with the MOSFETs 128,129 being turned off, the SSR 140 is energized through diode 146 when the voltage is provided to the motor 105 in the normal state, and is energized through diode 148 for the reverse polarity of the voltage to the motor 105 in the reverse state.

The type of SSR with a triac output is usually employed in alternating current (AC) applications because a triac will not turn off with the control voltage removed unless the load current is interrupted independently. In AC applications, the cycle through zero occurs naturally and is the mechanism that ultimately causes conduction to stop when the control voltage is removed. In the present embodiment, the control voltage (e.g., across the drain to source of MOSFET 128) remains on, but current through the motor 105 is sustained only while such motor is turning and the stored energy is being dissipated in resistor 142.

In a similar manner, dynamic breaking occurs when MOSFET 129 turns off at the end of a reverse cycle, with "b" positive with respect to "a." At that time, the full voltage of the voltage source 134 (less the relatively small forward voltage across the body diode 130 of MOSFET 128) appears across MOSFET 129, with its drain positive with respect to its source. However, conduction is initiated from the drain of MOSFET 129, through diode 148 and resistor 144 to the positive (+) input of the SSR 140, and back through the SSR negative (−) input to the source of MOSFET 129, thereby turning the SSR 140 on.

The exemplary SSR 140 employs a triac output, although back-to-back MOSFETs may be employed.

As frost on mechanical switches is known to prevent operation, and mechanical contacts are known to fail due to switching motor current, those problems are overcome with solid state switching as discussed above in connection with FIG. 7.

While the exemplary embodiment employs proximity sensors 107,108 to directly detect linear position and solid state switches 128,129 instead of cam-operated switches, other sensors and switches may be employed. For example, proximity switches may be employed to detect lobes on a cam, or the solid state devices which open the motor circuit may be replaced with electromechanical contactors or any combination thereof.

The exemplary two-wire motor control circuits are advantageous in that either one or three wires are eliminated, thereby simplifying wiring and reducing costs, as compared to known prior railway switch machine motor control circuits.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A control apparatus for a railway switch machine having a reversible motor, said control apparatus comprising:

means for sourcing a voltage;
    means for providing the voltage to said reversible motor in a normal state, and for providing a reverse polarity of the voltage to said reversible motor in a reverse state;
    first means for switching current flowing through said reversible motor;
    a first diode electrically connected in parallel with said first means for switching, said first diode conducting normal current for said reversible motor;
    second means for switching current flowing through said reversible motor, said second means electrically connected in series with said first means;
    a second diode electrically connected in parallel with said second means for switching, said second diode conducting reverse current for said reversible motor; and
    means for controlling said first and second means for switching.

2. The control apparatus as recited in claim 1, wherein said means for providing includes a two-pole double throw switch.

3. The control apparatus as recited in claim 1, wherein said means for controlling includes means for sensing positions of said switch machine, means for operating said first and second means for switching in response to said sensed positions in order to selectively control energization of said motor, and means for selectively applying dynamic braking to the motor when said means for operating said first and second means de-energizes the motor.

4. The control apparatus as recited in claim 3, wherein said means for sensing positions of said switch machine includes proximity sensors of a linear slide element which is positioned within the switch machine in order to respond to linear movement thereof.

5. The control apparatus as recited in claim 4, wherein said proximity sensors include a normal sensor for sensing end of normal movement, and a reverse sensor for sensing end of reverse movement.

6. The control apparatus as recited in claim 1, wherein said means for sensing positions of said switch machine includes rotary sensors which are positioned within the switch machine in order to respond to rotary movement therein.

7. The control apparatus as recited in claim 1, wherein said railway switch machine includes a manual mode of operation; and wherein said means for controlling said first and second means for switching includes means for sensing said manual mode of operation and disabling said first and second means for switching in response thereto.

8. The control apparatus as recited in claim 1, wherein said railway switch machine includes a fully normal position and a fully reverse position; and wherein said means for controlling said first and second means for switching includes means for sensing said fully normal position and disabling said second means for switching in response thereto, and means for sensing said fully reverse position and disabling said first means for switching in response thereto.

9. The control apparatus as recited in claim 1, wherein said first means for switching current and said second means for switching current include two transistors which are electrically connected in series with said reversible motor.

10. The control apparatus as recited in claim 9, wherein each of said transistors has a source electrically connected to the source of the other transistor.

11. The control apparatus as recited in claim 10, wherein said transistors also have a drain; and wherein said first and second diodes have a cathode and an anode, with the anodes of said first and second diodes being electrically connected to the sources of said transistors, and with the cathode of each of said first and second diodes being electrically connected to the drain of a corresponding one of said transistors.

12. The control apparatus as recited in claim 10, wherein said means for controlling includes means for sensing positions of said switch machine, means for controlling said transistors in response to said sensed positions in order to selectively control energization of said motor, and means for selectively applying dynamic braking to the motor when said means for switching said transistors de-energizes the motor.

13. The control apparatus as recited in claim 12, wherein said means for selectively applying dynamic braking includes a series combination of a solid state relay and a resistor, said series combination being electrically connected in parallel with said motor.

14. The control apparatus as recited in claim 10, wherein said switch machine has a normal stroke and a reverse stroke; wherein said transistors include a first transistor for switching the normal current of said reversible motor; and wherein when the normal stroke is completed, said means for controlling said first and second means turns off said first transistor and said second diode blocks the normal current for said reversible motor.

15. The control apparatus as recited in claim 14, wherein after the normal stroke is completed and when the reverse stroke is initiated, the reverse current for said reversible motor is conducted by the second diode when said first transistor is turned off.

16. The control apparatus as recited in claim 15, wherein after the reverse stroke is completed, said means for controlling said first and second means turns off said second transistor and said first diode blocks the reverse current for said reversible motor.

17. The control apparatus as recited in claim 10, wherein with both of said transistors being turned on, said transistors conduct both the normal current and the reverse current for said reversible motor.

18. The control apparatus as recited in claim 10, wherein said means for controlling said first and second means includes means for selectively turning on only one of said transistors in order to selectively conduct only one of the normal current and the reverse current.

19. The control apparatus as recited in claim 13, wherein the solid state relay includes an input; wherein said transistors include a first MOSFET transistor having a drain and a second MOSFET transistor having a drain; wherein a third diode is electrically interconnected between the drain of the first MOSFET transistor and the input of the solid state relay; wherein a fourth diode is electrically interconnected between the drain of the second MOSFET transistor and the input of the solid state relay; and wherein with the MOSFET transistors being turned off, the solid state relay is energized through the third diode when the voltage is provided to said reversible motor in the normal state, and is energized through the fourth diode for the reverse polarity of the voltage to said reversible motor in the reverse state.

20. The control apparatus as recited in claim 19, wherein with the solid state relay being energized, the motor acts as a generator with stored energy of motion being dissipated in the resistor.

21. The control apparatus as recited in claim 19, wherein said resistor is a first resistor; and wherein a second resistor is electrically connected between the input of the solid state relay and said third and fourth diodes.

22. A control apparatus for a railway switch machine having a reversible motor, said control apparatus comprising:

means for sourcing a voltage;
means for providing the voltage to said reversible motor in a normal state, and for providing a reverse polarity of the voltage to said reversible motor in a reverse state;
first means for switching current flowing through said reversible motor;
a first diode electrically connected in parallel with said first means for switching, said first diode conducting normal current for said reversible motor;
second means for switching current flowing through said reversible motor;
a second diode electrically connected in parallel with said second means for switching, said second diode conducting reverse current for said reversible motor; and
means for controlling said first and second means for switching, said means for controlling including means for sensing positions of said switch machine, means for operating said first and second means for switching in response to said sensed positions in order to selectively control energization of said motor, and means for selectively applying dynamic braking to the motor when said means for operating said first and second means de-energizes the motor, said means for selectively applying dynamic braking includes a series combination of a solid state relay and a resistor, said series combination being electrically connected in parallel with said motor.

23. A control apparatus for a railway switch machine having a reversible motor, said control apparatus comprising:

means for sourcing a voltage;
means for providing the voltage to said reversible motor in a normal state, and for providing a reverse polarity of the voltage to said reversible motor in a reverse state;
first means for switching current flowing through said reversible motor;
a first diode electrically connected in parallel with said first means for switching, said first diode conducting normal current for said reversible motor;
second means for switching current flowing through said reversible motor;
a second diode electrically connected in parallel with said second means for switching, said second diode conducting reverse current for said reversible motor; and
means for controlling said first and second means for switching,
wherein said first means for switching current and said second means for switching current include first and second cam switches which are electrically connected in series with said reversible motor,
wherein said switch machine has a normal stroke and a reverse stroke; and
wherein when the normal stroke is completed, said means for controlling said first and second means opens said first cam switch and said second diode blocks the normal current for said motor.

24. The control apparatus as recited in claim 23, wherein after the normal stroke is completed and when the reverse stroke is initiated by said reverse state, the reverse current for said motor is conducted by the second diode when said first cam switch is open.

25. The control apparatus as recited in claim 24, wherein after the reverse stroke is completed, said means for controlling said first and second means opens said second cam switch and said first diode blocks the reverse current for said motor.

26. The control apparatus as recited in claim 23, wherein said reversible motor includes a first terminal, a second terminal, a field winding, and a bridge rectifier having a first input, a second input and an output which energizes the field winding; and wherein the first cam switch is electrically connected to the first terminal of said reversible motor, the second terminal of said reversible motor is electrically connected to the first input of said bridge rectifier, and the second cam switch is electrically connected to the second input of said bridge rectifier, in order that there are two electrical connections between said reversible motor and said cam switches.

27. A control apparatus for a railway switch machine having a reversible motor which is powered by a power source having a voltage, said control apparatus comprising:

means for providing the voltage from said power source to said reversible motor in a normal state, and for providing a reverse polarity of the voltage to said reversible motor in a reverse state;
first means for switching current flowing through said reversible motor;
a first diode electrically connected in parallel with said first means for switching, said first diode conducting normal current for said reversible motor;
second means for switching current flowing through said reversible motor, the second means electrically connected in series with the first means;
a second diode electrically connected in parallel with said second means for switching, said second diode conducting reverse current for said reversible motor; and
means for controlling said first and second means for switching.

28. The control apparatus of claim 27, wherein said first means for switching current switches said reverse current, and said second means for switching current switches said normal current for said reversible motor.

* * * * *